(12) United States Patent
Choi et al.

(10) Patent No.: US 12,508,237 B2
(45) Date of Patent: Dec. 30, 2025

(54) PHARMACEUTICAL COMPOSITION COMPRISING 4-HEXYLRESORCINOL AS ACTIVE INGREDIENT FOR PREVENTION OR TREATMENT OF BONE DISEASE

(71) Applicants: KYUNGPOOK NATIONAL UNIVERSITY INDUSTRY-ACADEMIC COOPERATION FOUNDATION, Daegu (KR); GANGNEUNG-WONJU NATIONAL UNIVERSITY INDUSTRY ACADEMY COOPERATION GROUP, Gangneung-si (KR)

(72) Inventors: Je-Yong Choi, Daegu (KR); Xiangguo Che, Daegu (KR); Hyun-Ju Kim, Daegu (KR); Dong-Kyo Lee, Changwon-si (KR); Seong-Gon Kim, Seoul (KR); Xian Jin, Daegu (KR)

(73) Assignees: KYUNGPOOK NATIONAL UNIVERSITY INDUSTRY-ACADEMIC COOPERATION FOUNDATION, Daegu (KR); GANGNEUNG-WONJU NATIONAL UNIVERSITY INDUSTRY ACADEMY COOPERATION GROUP, Gangneung-si (KR)

( * ) Notice: Subject to any disclaimer, the term of this patent is extended or adjusted under 35 U.S.C. 154(b) by 801 days.

(21) Appl. No.: 17/790,132

(22) PCT Filed: Dec. 28, 2020

(86) PCT No.: PCT/KR2020/019227
§ 371 (c)(1),
(2) Date: Jun. 30, 2022

(87) PCT Pub. No.: WO2021/137561
PCT Pub. Date: Jul. 8, 2021

(65) Prior Publication Data
US 2023/0049524 A1 Feb. 16, 2023

(30) Foreign Application Priority Data

Dec. 30, 2019 (KR) .......... 10-2019-0178187
Nov. 18, 2020 (KR) .......... 10-2020-0154564

(51) Int. Cl.
*A61K 31/05* (2006.01)
*A61K 9/06* (2006.01)
*A61K 47/44* (2017.01)
*A61P 19/10* (2006.01)

(52) U.S. Cl.
CPC .............. *A61K 31/05* (2013.01); *A61K 9/06* (2013.01); *A61K 47/44* (2013.01); *A61P 19/10* (2018.01)

(58) Field of Classification Search
None
See application file for complete search history.

(56) References Cited

U.S. PATENT DOCUMENTS

| | | | |
|---|---|---|---|
| 2006/0120975 A1 | 6/2006 | Scherl et al. | |
| 2008/0286377 A1 | 11/2008 | Healey et al. | |
| 2013/0171219 A1* | 7/2013 | Johnson .................. | A61P 17/02 424/59 |
| 2019/0224266 A1* | 7/2019 | Lin-Shiau .......... | A61K 31/5415 |

FOREIGN PATENT DOCUMENTS

| | | | | |
|---|---|---|---|---|
| KR | 10-2010-0066675 A | 6/2010 | | |
| KR | 10-2011-0050308 A | 5/2011 | | |
| KR | 10-2011-0135168 A | 12/2011 | | |
| KR | 10-2016-0028824 A | 3/2016 | | |
| KR | 1754155 B1 * | 7/2017 | ............. | A61K 31/05 |
| KR | 10-2056463 B1 | 12/2019 | | |

OTHER PUBLICATIONS

EFSA ANS Panel (EFSA Journal 12(4):3643, 35 pp. 2014) (Year: 2014).*
Derwent Accession No. 2017-48070A (English summary of Geun et al (KR 1754155 B1, 2017)). (Year: 2017).*
Siu et al (Evidence Based Complementary and Alternative Medicine 2015:905270 (10 pages), 2015) (Year: 2015).*
International Search Report for PCT/KR2020/019227 mailed Jun. 9, 2021 from Korean Intellectual Property Office.
Professor R. Walker, "4-HEXYLRESORCINOL", WHO Food Additive Series 35, 835, Dec. 21, 2019.
Korea Association of Colleges of Pharmacy, Pharmaceutical Sciences Division "pharmaceutical science".
Ji-Young Song et al., "Porcine Bone Incorporated With 4-Hexylresorcinol Increases New Bone Formation by Suppression of the Nuclear Factor Kappa B Signaling Pathway", Journal of Craniofacial Surgery, Oct. 2018 , 29(7): pp. 1983-1990.
Michael McClung, "Role of RANKL inhibition in osteoporosis", Arthritis Research & Therapy, 2007, 9(Suppl 1):S3 (doi:10.1186/ar2167).

* cited by examiner

*Primary Examiner* — Craig D Ricci
(74) *Attorney, Agent, or Firm* — Revolution IP, PLLC

(57) ABSTRACT

The present invention relates to a composition comprising 4-hexylresorcinol (4-HR) as an active ingredient for prevention or treatment of a bone disease, and a formulation thereof. The composition comprising 4-hexylresorcinol (4-HR) as an active ingredient, or an ointment thereof was found to improve bone thickness, density, and strength and control bone remodeling by promoting the differentiation of osteoblasts and suppressing the proliferation and differentiation of osteoclasts in osteoporosis-induced animal models. Thus, the composition or ointment comprising 4-hexylresorcinol (4-HR) as an active ingredient can be provided as a therapeutic agent for bone diseases including bone fracture, osteoarthritis, rheumatoid arthritis, and osteoporosis.

1 Claim, 6 Drawing Sheets

*p<0.05 compared with Sham
p<0.05 compared with OVX-control

PHARMACEUTICAL COMPOSITION COMPRISING 4-HEXYLRESORCINOL AS ACTIVE INGREDIENT FOR PREVENTION OR TREATMENT OF BONE DISEASE

CROSS REFERENCE TO PRIOR APPLICATIONS

This application is the 35 U.S.C. 371 national stage of international application PCT/KR2020/019227 filed on Dec. 28, 2020 which claims priority to Korean Patent Application Nos. 10-2019-0178187 filed on Dec. 30, 2019 and 10-2020-0154564 filed on Nov. 18, 2020. The entire contents of each of the above-identified applications are hereby incorporated by reference.

TECHNICAL FIELD

The present disclosure relates to a composition for preventing or treating bone diseases including 4-hexylresorcinol (4-HR) as an active ingredient, and a formulation thereof.

BACKGROUND ART

Osteoporosis is a bone remodeling disease of the skeletal tissue that is easy to fracture even with a small impact due to weakened bone strength. The maintenance of adult bone is through bone remodeling in which bone resorption by osteoclasts and bone formation by osteoblasts sequentially occur at local sites. Osteoclasts adhere to the surface of the old crack bone and secrete acids and decomposing enzymes to remove the bone mineral and matrix proteins, respectively. On the other hand, osteoblasts secrete matrix vesicles containing calcium-phosphate crystals to form new bones and maintain the skeleton. Approximately 10 to 30% of adult bone is regenerated annually by bone remodeling.

Homeostasis in the bone is controlled by various systemic and local factors in the body. However, an imbalance in the interaction between osteoblasts and osteoclasts due to hormonal abnormalities or stress in the body causes metabolic bone diseases. Excessive activity is induced until the 30s to 50s, and the ratio of bone resorption and bone formation is out of balance. Thus, bone loss occurs, and osteoporosis is induced.

With the aging of the global population, interest in osteoporosis and therapeutics is gradually increasing. It has been reported that a market worth about 130 billion dollars is being formed in relation to the treatment of osteoporosis and other bone diseases, and the market for the treatment of osteoporosis is expected to grow further in the future. Thus, global research institutes or pharmaceutical companies are investing heavily in the development of therapeutic agents for bone diseases.

Therapeutic agents for bone diseases may be divided into estrogen preparations, bisphosphonate preparations, and parathyroid hormone preparations, which are traditionally, largely used in postmenopausal women. Estrogen preparations are effective in reducing fractures, but they should be used with caution as they increase the risk of thrombosis and breast cancer. Bisphosphonates are the most widely used drugs that inhibit osteoclast function and reduce the number of osteoclasts to prevent osteoclast formation. Unlike other drugs for osteoporosis, PTH is an anabolic and increases bone tissue because osteoblasts are directly activated to form new bone. However, it is expensive and needs to be administered by injection. In order to solve the issue, there is a need for research and development of prevention and therapeutic agents effective in osteoporosis, while reducing the discomfort in the drug administration and ensuring safe administration without side effects.

PRIOR ART DOCUMENT

Patent Document

Korea Patent Application Publication No. 10-2011-0135168 (published on Dec. 16, 2011)

DISCLOSURE

Technical Goals

Conventional bisphosphonate-based drugs suppress the activity of osteoclasts and so are representative drugs for treating bone diseases such as osteoporosis. However, there are side effects such as the death of osteoclasts, osteonecrosis of jaws, atypical fracture, delayed fracture healing, and injection discomfort. It is an object of the present disclosure to provide a therapeutic agent for bone diseases that inhibits osteoclast activity without inducing cell death and at the same time stimulates osteoblast activity. In addition, there is an advantage of easy administration as an ointment.

Technical Solutions

The present disclosure provides a pharmaceutical composition for preventing or treating bone diseases comprising 4-hexylresorcinol (4-HR) or a pharmaceutically acceptable salt thereof as an active ingredient.

Advantageous Effects

According to example embodiments of the present disclosure, it was found that a composition or ointment including 4-hexylresorcinol (4-HR) as an active ingredient improved thickness, density, and strength of bone in an animal model induced with osteoporosis and regulated bone remodeling by promoting differentiation of osteoblasts while suppressing proliferation and differentiation of osteoclasts. Thus, the composition or ointment including 4-HR as an active ingredient may be provided as a therapeutic agent for bone diseases including fractures, osteoarthritis, rheumatoid arthritis, and osteoporosis.

BRIEF DESCRIPTIONS OF THE DRAWINGS

FIG. 1 shows micro-CT images and graphs evaluating the effect of 4-hexylresorcinol (4-HR) on trabecular bone and cortical bone in an animal model with osteoporosis. A shows results of identifying changes in trabecular bone volume/tissue volume (BV/TV) and trabecular thickness (Tb.Th), and B shows results of identifying changes in cortical bone volume/tissue volume (BV/TV) and cortical bone mineral density (BMD).

BEST MODE

Figure 1:
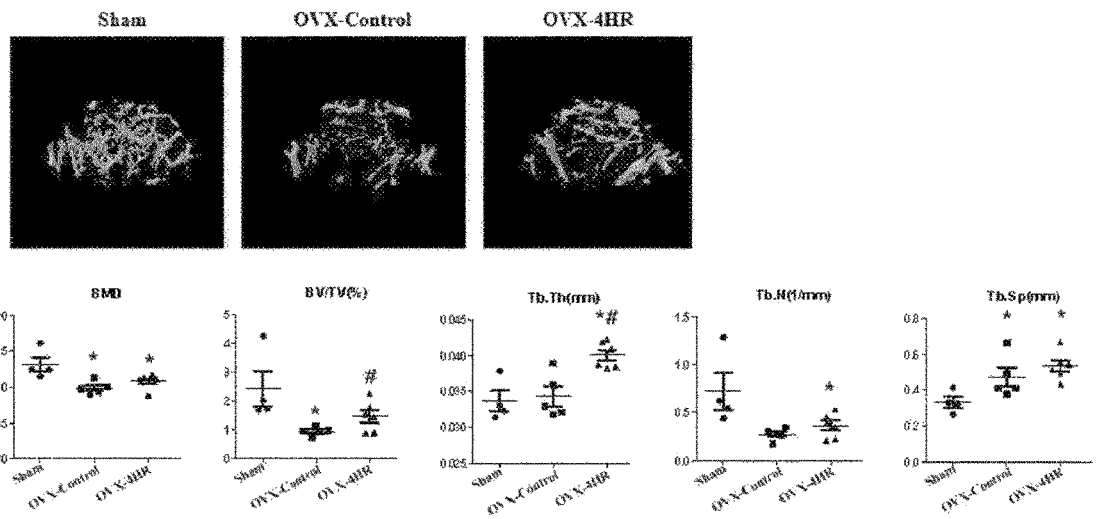
Figure 1:
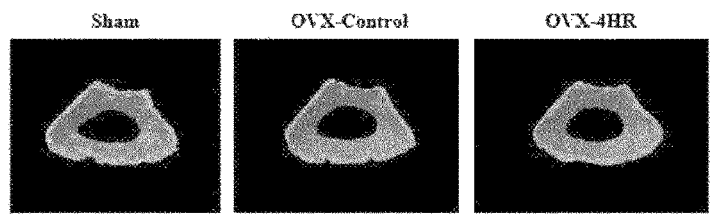
Figure 1:
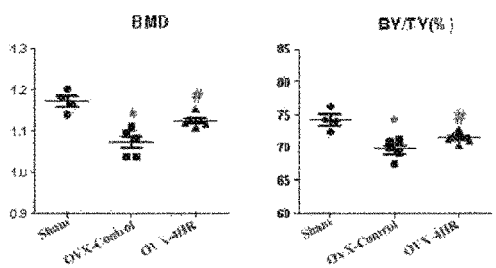

The terms used in the specification are common terms that are currently, widely used and selected in consideration of the functions in the present disclosure. However, these may vary depending on the intention or precedent of a person skilled in the art and the advent of new technology. In addition, in certain cases, there may be a term arbitrarily selected by the applicant. In that case, the meaning will be described in detail in the description of the disclosure corresponding to the same. Therefore, the term used in the present disclosure should be defined based on the meaning of the term and the overall content of the present disclosure, rather than the simple name of the term.

Unless otherwise defined, all terms used herein, including technical or scientific terms, have the same meaning as commonly understood by those skilled in the art to which the present disclosure belongs. Terms as those defined in a commonly used dictionary should be interpreted as having a meaning consistent with the meaning in the context of the related art, and should not be interpreted in an ideal or excessively formal meaning unless explicitly defined in the present application.

Numerical ranges are inclusive of numerical values defined in the range. Every maximum numerical limitation given throughout the specification includes all the lower numerical limitations as if the lower numerical limitation were expressly written. Every minimum numerical limitation given throughout the specification includes all the higher numerical limitations as if the higher numerical limitation were expressly written. All the numerical limitations given throughout the specification will include all the better numerical ranges within the broader numerical range as if the narrower numerical limitation were expressly written.

Hereinafter, example embodiments of the present disclosure will be described in detail.

An example embodiment of the present disclosure provides a pharmaceutical composition for preventing or treating bone diseases, including 4-hexylresorcinol (4-HR) or a pharmaceutically acceptable salt thereof as an active ingredient.

The 4-hexylresorcinol (4-HR) is a substance called 4-hexylbenzene-1,3-diol under the IUPAC name with a chemical formula of $C_{12}H_{18}O_2$, and the structure thereof is represented by Chemical Formula 1 below.

[Chemical Formula 1]

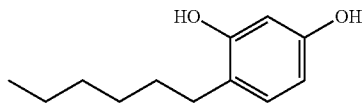

The 4-hexylresorcinol (4-HR) exhibits the activity of increasing bone volume, bone density, and bone thickness, reduces the level of CTX in the blood, and shows the effect of increasing the level of ALP.

The 4-hexylresorcinol (4-HR) exhibits an anti-obesity activity of reducing abdominal fat accumulation.

The 4-hexylresorcinol (4-HR) exhibits an activity of promoting the differentiation of osteoblasts while suppressing the differentiation of osteoclasts.

The bone diseases may include fracture, osteoarthritis, rheumatoid arthritis, and osteoporosis, but are not limited thereto.

The pharmaceutical composition may be formulated in the form of one or more external preparations selected from the group consisting of creams, gels, patches, sprays, ointments, plasters, lotions, liniments, pastes, and cataplasmas.

The pharmaceutical composition of an example embodiment of the present disclosure may include a pharmaceutically acceptable carrier and diluent additionally required for formulation. The pharmaceutically acceptable carrier and diluent include excipients such as starch, sugar, and mannitol, fillers and extenders such as calcium phosphate, cellulose derivatives such as carboxymethyl cellulose and hydroxypropyl cellulose, binders such as gelatin, alginate, and polyvinyl pyrrolidone, lubricants such as talc, calcium stearate, hydrogenated castor oil, and polyethylene glycol, disintegrants such as povidone and crospovidone, and surfactants such as polysorbate, cetyl alcohol, and glycerol, but are not limited thereto. The pharmaceutically acceptable carrier and diluent may be biologically and physiologically compatible with a subject. Examples of the diluent may include saline, aqueous buffers, solvents, and/or dispersion media, but are not limited thereto.

The pharmaceutical composition of an example embodiment of the present disclosure may be administered in a topical, parenteral route that involves absorption via application to the skin according to the desired method. In addition, a range of dosages of the pharmaceutical composition of an example embodiment of the present disclosure varies depending on the subject's body weight, age, sex, health status, diet, administration duration, administration method, excretion rate, and severity of disease, but is not limited thereto.

Modes for Carrying Out Invention

Hereinafter, examples will be described in detail to help the understanding of the present disclosure. However, the following examples are merely illustrative of the content of the present disclosure, and the scope of the present disclosure is not limited to the following examples. The examples of the present disclosure are provided to more completely explain the present disclosure to those skilled in the art.

Experimental Example

Following experimental examples are intended to provide experimental examples commonly applied to each example embodiment according to an example embodiment of the present disclosure.

1. Reagents

Alizarin red S, an alkaline phosphatase (ALP) staining kit, ascorbic acid, β-glycerophosphate, Naphthol AS-MX phosphate, dimethyl sulfoxide (DMSO), N, N-dimethylformamide, fast red violet LB, and paraformaldehyde (PFA) used in the example embodiment was purchased from Sigma-Aldrich (St. Louis, MO).

Acetone, a formaldehyde solution, sodium acetate trihydrate, sodium tartrate dihydrate, ethanol, and glycerol used in the example embodiment were purchased from JUNSEI (Nihonbashi-honcho, Chuo-ku, Tokyo). α-Minimum Essential Medium (α-MEM) was purchased from Thermo Scientific (Rockford, IL, U.S.A).

Fetal bovine serum (FBS) used in the example embodiment was purchased from GIBCO (Grand Island, NY, U.S.A), and human macrophage-colony stimulation factor (M-CSF) from PEPROTECH, INC. (Rocky Hill, NJ, USA), N, N-dimethyl-p-toluidine from MP Biomedicals (Solon-Ohio, BC, U.S.A), penicillin/streptomycin from Lonza (Rockland, ME, USA), and red blood cell lysis solution from BioLegend (San Diego, CA, U.S.A). The receptor activator for nuclear factor κB ligand (RANKL) was purchased from R&D Systems (Minneapolis, MN, U.S.A).

2. Cell Culture

MC3T3-E1 (mouse calvaria osteoblast cell line) cells were cultured in α-MEM containing 10% (v/v) FBS, penicillin (100 units/ml), and streptomycin (100 units/ml) using a constant temperature and humidity incubator in the presence of 5% (v/v) $CO_2$ at 37° C. When the culture dish was filled with osteoblasts with 100% confluency, 50 μg/ml of ascorbic acid and 10 mM of β-glycerophosphate were treated to induce cell differentiation. During cell differentiation, the differentiation medium was replaced every 3 days.

Mouse bone marrow monocyte (BMM) cells were isolated from the femur and tibia in 8-week-old mice. Muscle was removed after the separation of the femur and tibia from the mice euthanized by cervical dislocation, both ends were cut out, and α-MEM was filtered with a syringe to separate bone marrow cells. After centrifuging the isolated bone marrow cells, red blood cell lysis solution was added to hemolyze red blood cells, and then culture was performed for a day in the α-MEM containing 10% (v/v) FBS, penicillin (100 units/ml), and streptomycin (100 units/ml) using the constant temperature and humidity incubator in the presence of 5% (v/v) $CO_2$ at 37° C. Only suspending cells not adhering to the culture dish were collected, treated with 20 ng/ml of M-CSF, and cultured for 3 days to obtain bone marrow-derived monocyte/macrophage. In an attempt to differentiate macrophages into osteoclasts, 20 ng/ml of M-CSF and 30 ng/ml of RANKL were treated, followed by culture for 4 days. Media were replaced every 2 days while differentiation was induced.

3. Alkaline Phosphatase (ALP) Staining

MC3T3-E1 and bone marrow stem cells were inoculated into a 48-well multi-plate at $5 \times 10^4$ cells/well, and culture was performed for 7 days with treatment of 4-hexylresorcinol (4-HR) at a concentration of $10^{-9}$ M to $10^{-6}$ M while a differentiation induction medium was replaced every 2 days. After the culture, cells were washed with PBS three times, and a fixative containing 5 ml of citrate acid, 13 ml of acetone, and 1.6 ml of a formaldehyde solution was treated for 45 seconds. Then, the cells were washed twice with PBS, treated with an alkaline-dye mixture, and reacted at room temperature in the darkness for 30 minutes. After removing the solution, cells were washed several times with PBS and observed under a microscope.

4. Alizarin Red S Staining (Mineralization)

MC3T3-E1 and bone marrow stem cells were inoculated into a 48-well multi-plate at $5 \times 10^4$ cells/well, and a culture was performed for 14-21 days with treatment of 4-hexylresorcinol (4-HR) at a concentration of $10^{-9}$ M to $10^{-4}$ M while the differentiation induction medium was replaced every 2 days. After incubation, the cells were washed three times with PBS and immobilized at room temperature for 10 minutes using 4% formaldehyde as a fixative. The cells were washed three times with tertiary distilled water, and pH 4.2 Alizarin red solution was added at room temperature for 10 minutes for staining. The cells were washed several times with PBS and observed under a microscope.

5. Tartrate Resistant Acid Phosphatase (TRAP) Staining

Medullary mononuclear cells isolated from the femur and tibia of mice were treated with 20 ng/ml of M-CSF and reacted for a day. After harvesting cells attached to the culture dish, the cells were dispensed in a 96-well multi-plate at $5 \times 10^4$ cells/well, and cultured for 4 days with treatment of 4-hexylresorcinol (4-HR) at a concentration of 10 M to 6 M while replacing with an osteoclast differentiation induction medium. After removing the medium and washing with PBS, the cells were immobilized with 10% formaldehyde solution and treated with a TRAP staining solution in which Naphthol As-Mx phosphate red violet LB (Naphthol As-Mx, Fast red violet LB) and N, N-dimethylformamide were dissolved in 50 mM of pH 5.0 acetate buffer, followed by staining at 37° C. for 30 minutes. The solution was removed, washed with PBS twice, and then observed under a microscope.

6. Pit Assay

Monocytes were sterilized and inoculated on bone slices placed on a 96-well plate, followed by culture for 3 days in the presence of RANKL (30 ng/ml) and M-CSF (30 ng/ml). After 3 days, the differentiated osteoclasts were treated with 4-hexylresorcinol (4-HR), and a culture was performed for 2 days. After 2 days of culture, osteoclasts were removed and bone slices were reacted with horseradish peroxidase-wheat germ agglutinin (Sigma-Aldrich) and then stained with 3,3'-diaminobenzidine (Sigma-Aldrich). Stained cells were analyzed according to the manufacturer's method using a Java-based image analysis program (ImageJ).

7. Micro-CT Analysis

After separating the mouse femur and removing muscle, fixation was performed using 4% PFA at 4° C. for a day. The next day, washing was followed three times with PBS solution to be stored in PBS. The femur stored thereby was analyzed with a Skysan 1272 (Bruker, Massachusetts, USA) model by scanning, in units of 6 μm, the section from 1.6 mm to 2.3 mm below the growth plate. Using micro-CT, during the measurement of trabecular bone volume/tissue volume (BV/TV), trabecular thickness (Tb.Th), trabecular number (Tb.N), trabecular separation (Tb.Sp), and trabecular bone mineral density (BMD), bone volume/tissue volume (BV/TV) and bone mineral density (BMD) of cortical bone was measured as well.

8. Measurement of Bone Strength

After separating the mouse femur and removing muscle, the femur was put in pH 7.4, 0.9% NaCl, and stored at −20° C. Before analyzing the sample, it was slowly thawed at 4° C., and max load (N) and slope (N/mm) were measured with Instron (Tensile Tester, Williamston, SC, USA).

<Example 1> Preparation of 4-Hexylresorcinol (4-HR) Ointment

A 4-hexylresorcinol (4-HR) reagent was dissolved in ethanol and diluted to 1000× when treated to cells. As an ointment base material, lanolin oil purchased from Sigma was used. The weight of lanolin oil was measured, and 4-hexylresorcinol (4-HR) powder equivalent to 2% weight of lanolin oil was dissolved in 100% ethanol. After the lanolin oil was completely liquefied in a water bath set at 50° C. to 60° C., 4-hexylresorcinol (4-HR) dissolved in ethanol was added and mixed with a homogenizer. By evaporating residual ethanol in the water bath, lanolin oil mixed with 4-hexylresorcinol (4-HR) was prepared in the form of an ointment.

<Example 2> Identification of Therapeutic Effects on Osteoporosis by Administration of the Ointment Containing 4-Hexylresorcinol (4-HR)

1. Identification of Bone Volume Increasing Effect by Administration of the 4-HR-Containing Ointment To evaluate the effect of 4-hexylresorcinol (4-HR) on bone remodeling, the ointment containing 2% 4-HR was applied to the mouse dorsal skin for 4 weeks after induction of osteoporosis via ovariectomy (OVX) in a model with osteoporosis, and the change in bone volume was analyzed by micro-CT.

As shown in FIG. 1, osteoporosis (OVX) induced mice showed a decrease in the bone volume in the skull. In the case of a group of osteoporosis (OVX) induced mice applied with 4-hexylresorcinol (4-HR), bone volume was increased, and bone density, trabecular number, and trabecular thickness were increased compared to the osteoporosis (OVX) induced mice.

The results above showed that 4-hexylresorcinol (4-HR) has the effect of increasing the bone volume reduced by induction of osteoporosis, demonstrating that the ointment containing 4-hexylresorcinol (4-HR) has a therapeutic effect on bone diseases.

2. Identification of Bone Strength Increasing Effect by Administration of the 4-HR-Containing Ointment To evaluate the effect of 4-hexylresorcinol (4-HR) on bone strength, 4-hexylresorcinol (4-HR) was periodically applied to the mouse model in which osteoporosis was induced by ovariectomy so as to check changes in bone strength.

Figure 2:
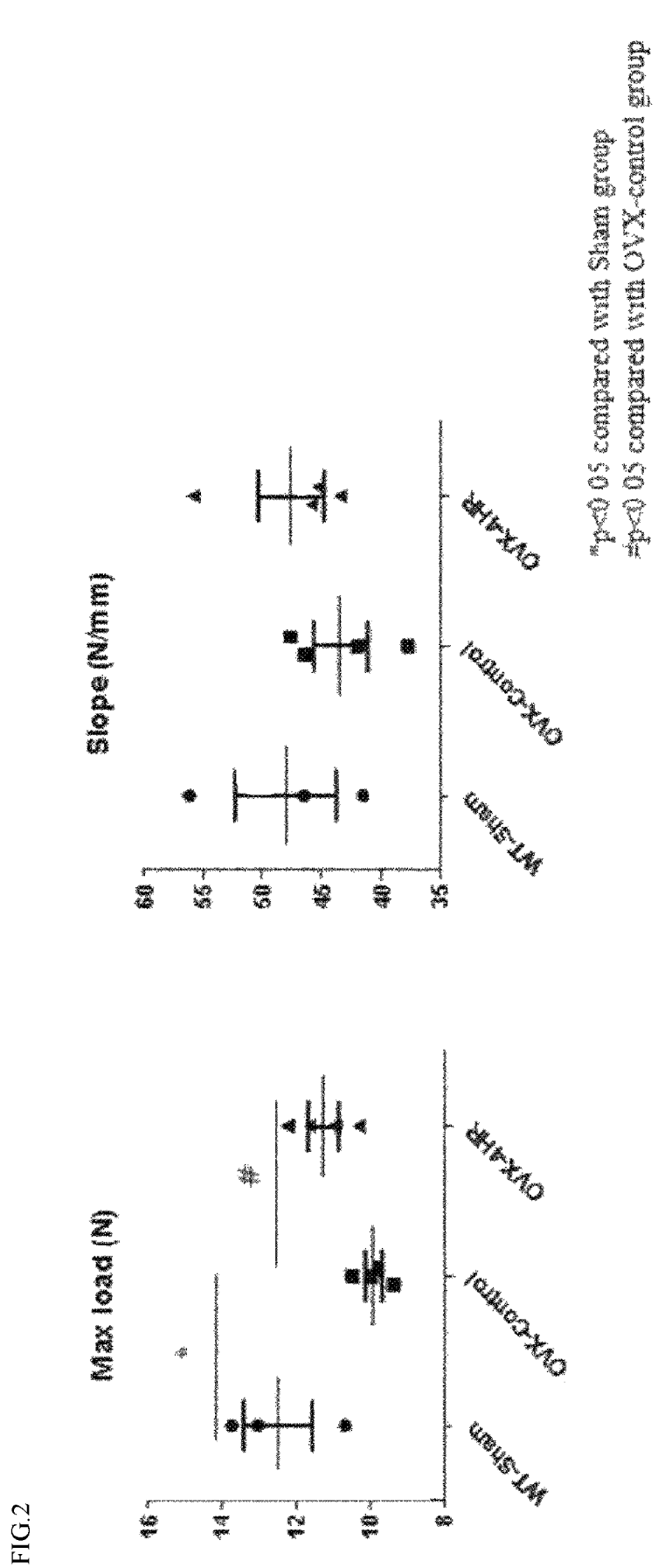
FIG. 2 shows graphs identifying an effect of 4-hexylresorcinol (4-HR) on bone strength in an animal model with osteoporosis.

As shown in FIG. 2, in the mouse model in which osteoporosis was induced by ovariectomy, both bone volume and bone strength were decreased. In the osteoporosis-induced mouse model group in which the 4-hexylresorcinol (4-HR) ointment was periodically applied, not only the bone volume but also the bone strength was increased in the mice compared to the control osteoporosis-induced mice.

The above results showed that 4-hexylresorcinol (4-HR) has the effect of increasing the bone volume and bone strength reduced by induction of osteoporosis, demonstrating that the ointment containing 4-hexylresorcinol (4-HR) has therapeutic effects on bone diseases.

3. Identification of Effect of Suppressing Bone Resorption and Promoting Bone Formation by Administration of the 4-HR-Containing Ointment To evaluate the effect of 4-hexylresorcinol (4-HR) on bone resorption and promoting bone formation, the levels of CTX, ALP, and RANKL in an animal model with osteoporosis were measured via blood biochemical analysis. CTX is used as a marker for evaluating the degree of bone resorption (bone destruction) in the blood, ALP is a marker that indicates the degree of bone formation secreted by osteoblasts, and RANKL is used as a marker that is secreted from osteoblasts and promotes differentiation of osteoclasts.

Figure 3:
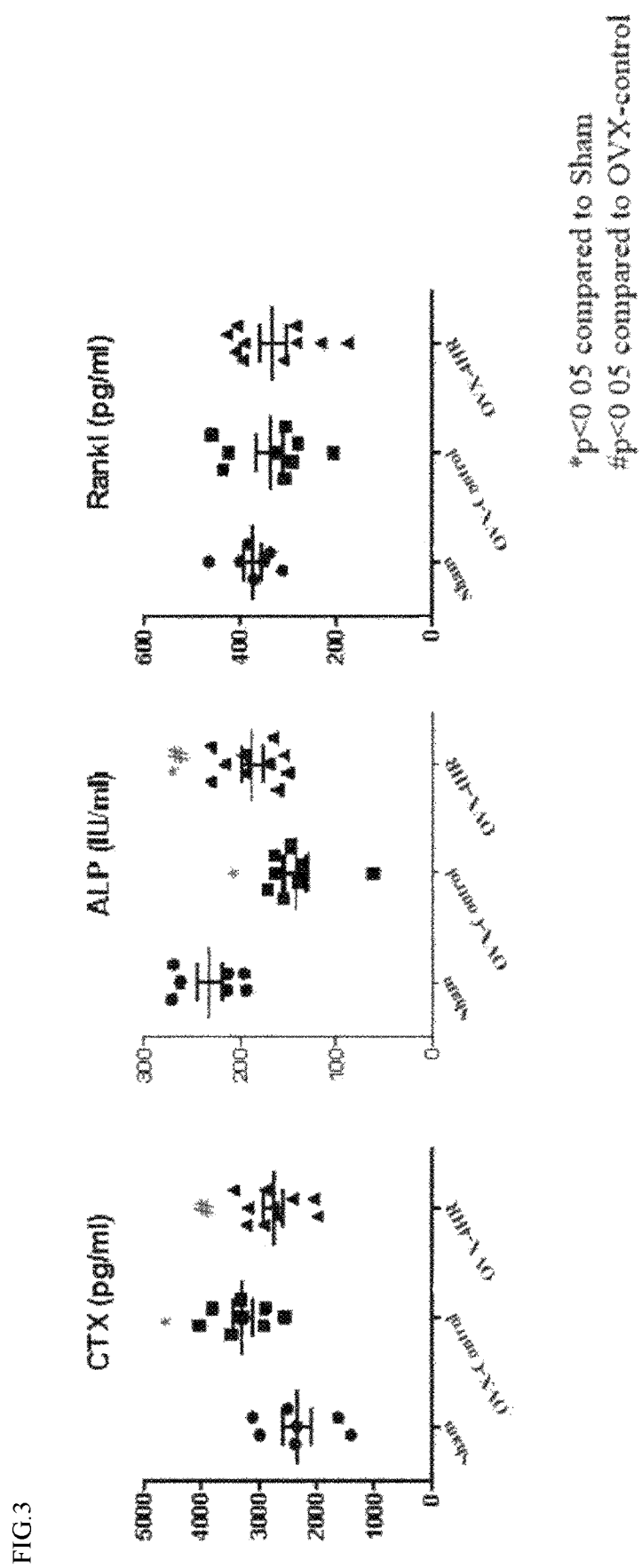
FIG. 3 shows graphs identifying an effect of 4-hexylresorcinol (4-HR) on serum levels of bone resorption and bone formation markers in an animal model with osteoporosis.

As shown in FIG. 3, it was found that the level of CTX increased while that of ALP decreased in the animal model with osteoporosis. In addition, when 4-hexylresorcinol (4-HR) was periodically applied to the animal model with osteoporosis, the level of CTX decreased while that of ALP increased.

The results above indicate that the increase in the bone resorption and decrease in the bone formation induced by osteoporosis are improved by the application of 4-hexylresorcinol (4-HR) to the skin, demonstrating that the ointment containing 4-hexylresorcinol (4-HR) exhibits therapeutic effects on osteoporosis.

4. Identification of the Effect of Inhibiting Abdominal Fat Accumulation by Administration of the 4-HR-Containing Ointment To identify whether 4-hexylresorcinol (4-HR) has anti-obesity effects, the ointment containing 4-hexylresorcinol (4-HR) was applied and the degree of abdominal fat accumulation was checked in an animal model with osteoporosis induced by ovariectomy.

Figure 4:
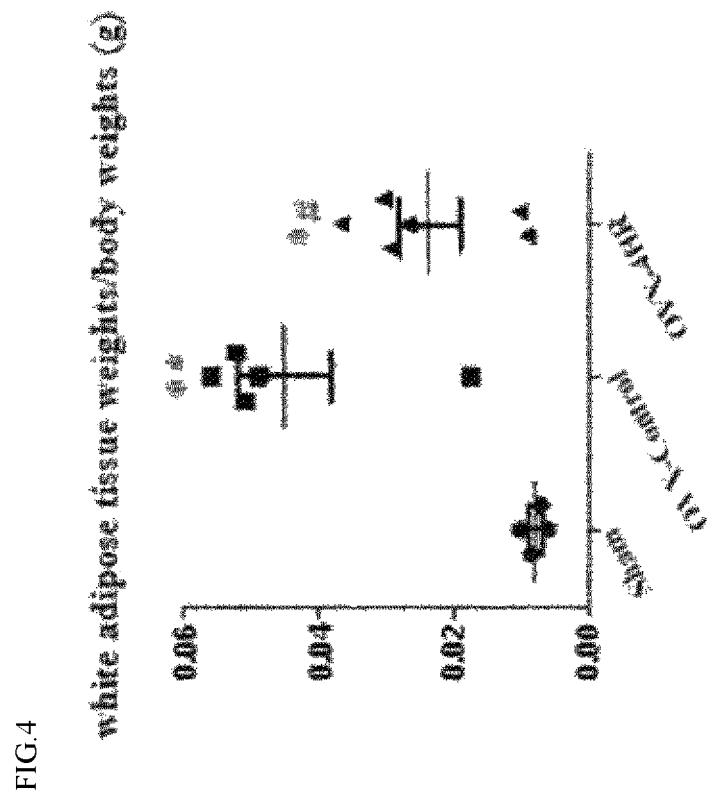
FIG. 4 shows a graph identifying the effect of 4-hexylresorcinol (4-HR) on abdominal fat accumulation in an animal model with osteoporosis.

As shown in FIG. 4, in the mouse model with osteoporosis, the bone volume decreased, and abdominal fat was accumulated, resulting in obesity. In the group applied with the ointment containing 4-hexylresorcinol (4-HR), the bone volume increased, but the abdominal fat accumulation decreased.

The above results show that abdominal fat accumulation and obesity induced by osteoporosis were improved by the application of 4-hexylresorcinol (4-HR) to the skin, demonstrating that the ointment containing 4-hexylresorcinol (4-HR) exhibits anti-obesity effects due to the lack of estrogen.

5. Promotion of Osteoblast Differentiation by 4-HR Treatment

To identify the effect of 4-hexylresorcinol (4-HR) on the differentiation of osteoblasts, 4-hexylresorcinol (4-HR) was treated to osteoblasts (MC3T3-E1) which were then subjected to the staining with alkaline phosphatase (ALP) and Alizarin red to check the degree of differentiation.

Figure 5:
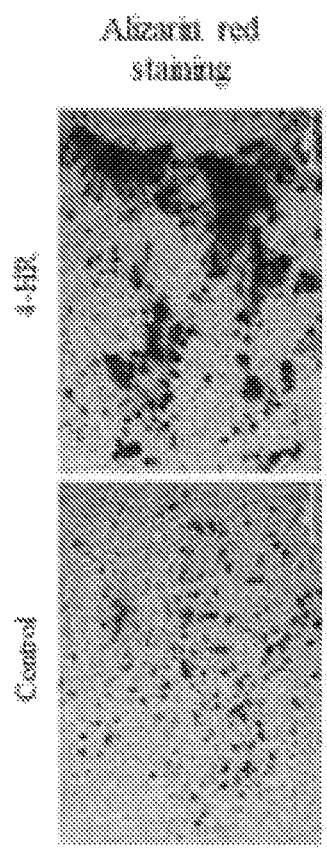
FIG. 5 shows images of staining with alkaline phosphatase (ALP) and Alizarin red to identify an effect of 4-hexylresorcinol (4-HR) on differentiation in osteoblasts.
Figure 5:
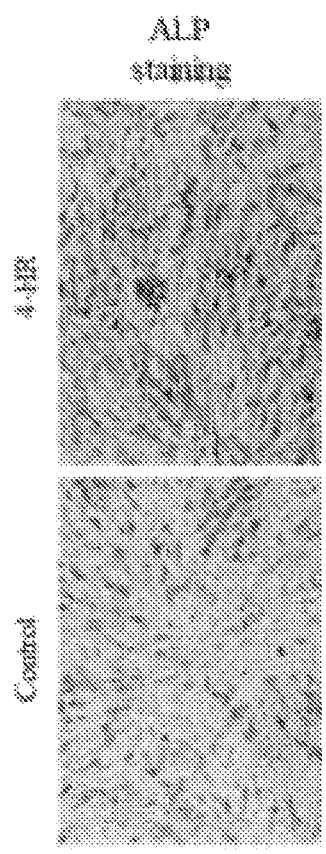

As shown in FIG. 5, it was found that differentiation was promoted by the treatment of 4-hexylresorcinol (4-HR) to osteoblasts (MC3T3-E1). The above results demonstrate that 4-hexylresorcinol (4-HR) promotes cell differentiation of osteoblasts.

6. Inhibition of Differentiation and Activity of Osteoclasts by 4-HR Treatment

To evaluate the effect of 4-hexylresorcinol (4-HR) on the differentiation and activity of osteoclasts, 4-hexylresorcinol (4-HR) was treated on osteoclasts, and cell differentiation and osteoclastic activity were checked by TRAP staining and PIT assay analysis.

Figure 6:
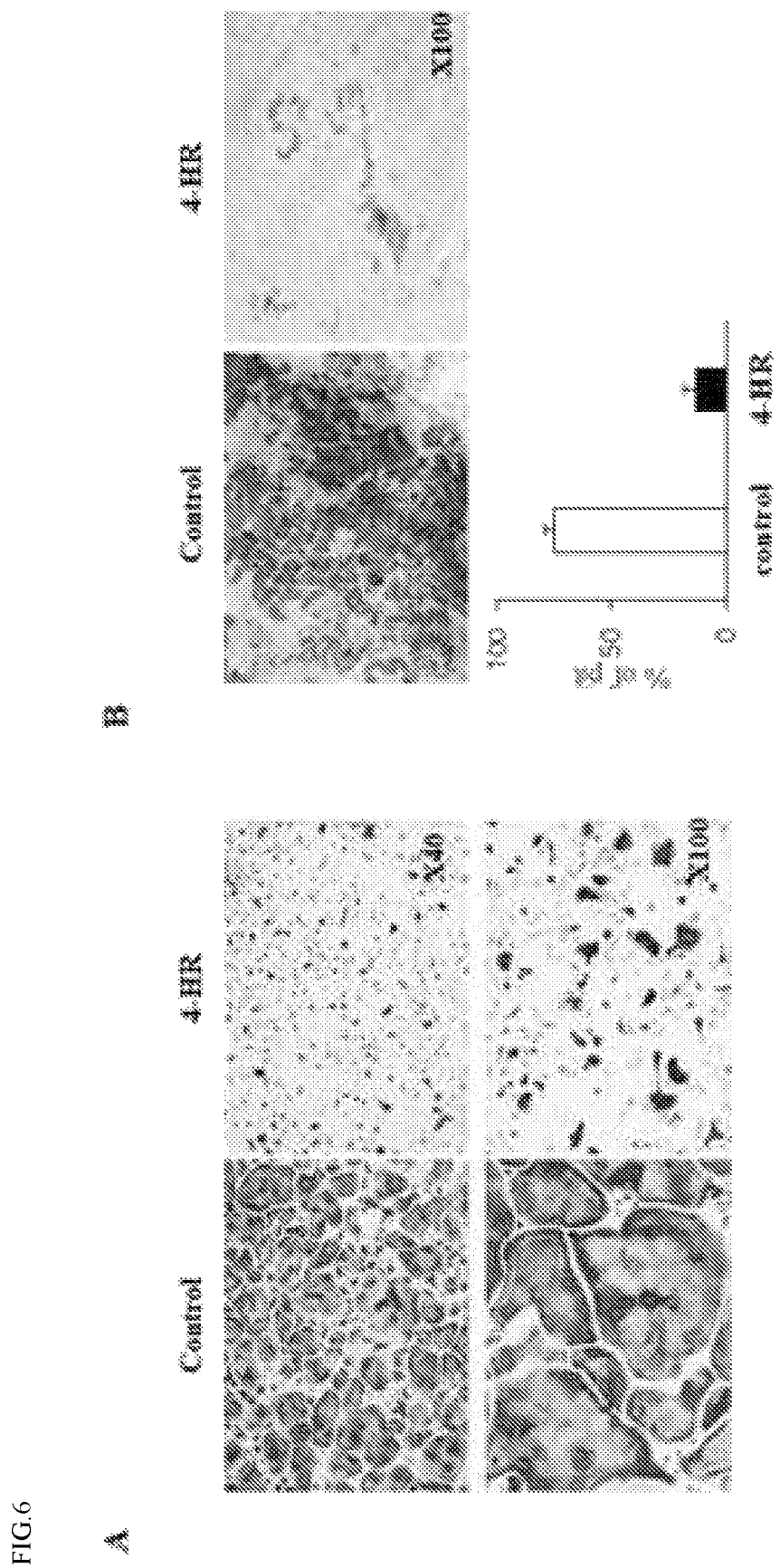
FIG. 6 shows results of identifying an effect of 4-hexylresorcinol (4-HR) on cell differentiation and osteoclast activity through TRAP staining and PIT assay.

As shown in FIG. 6, it was found that 4-hexylresorcinol (4-HR) inhibited the differentiation of osteoclasts as well as osteoclastic activity. The above results demonstrate that 4-hexylresorcinol (4-HR) inhibits osteoclasis by osteoclasts.

Although specific parts of the present disclosure have been described in detail above, it is clear for those skilled in the art that these specific descriptions are merely preferred exemplary embodiments and the scope of the present disclosure is not limited thereto. In other words, the substantial scope of the present disclosure is defined by the appended claims and equivalents thereof.

What is claimed is:

1. A method of simultaneously treating osteoporosis and reducing abdominal fat accumulation in a subject in need thereof, comprising:
topically applying an effective amount of a pharmaceutical ointment composition comprising about 2% by weight 4-hexylresorcinol (4-HR) in lanolin oil to a dorsal skin are of the subject,
wherein the 4-hexylresorcinol (4-HR) decreases a level of CTX in blood, increases a level of ALP, promotes differentiation of osteoblasts, and suppresses differentiation of osteoclasts, and wherein said applying increases bone volume, bone density, and bone thickness, and reduces abdominal fat accumulation in the subject.

\* \* \* \* \*